United States Patent [19]

Misawa

[11] Patent Number: 4,881,086

[45] Date of Patent: Nov. 14, 1989

[54] LASER RECORDER WITH SHEET EDGE DETECTION

[75] Inventor: Naoya Misawa, Osaka, Japan

[73] Assignee: Minolta Camera Kabushiki Kaisha, Osaka, Japan

[21] Appl. No.: 236,989

[22] Filed: Aug. 26, 1988

[30] Foreign Application Priority Data

Aug. 31, 1987 [JP] Japan ................................ 62-218285
Dec. 25, 1987 [JP] Japan ................................ 62-331055

[51] Int. Cl.⁴ ............................................. G01D 15/14
[52] U.S. Cl. .................................... 346/108; 250/561; 358/456
[58] Field of Search ................. 346/108, 107 R, 76 L, 346/160; 358/283, 293; 250/561, 559, 563

[56] References Cited

U.S. PATENT DOCUMENTS 4,292,529  9/1981  Thurston ............................ 250/561
4,494,130  1/1985  Kaneko et al. .
4,532,429  7/1985  Horikawa .
4,617,470  10/1986  Horikawa .

FOREIGN PATENT DOCUMENTS 58-31662  2/1983  Japan .
58-76853  5/1983  Japan .

*Primary Examiner*—Clifford C. Shaw
*Assistant Examiner*—Mark Reinhart
*Attorney, Agent, or Firm*—Burns, Doane, Swecker & Mathis

[57] ABSTRACT

A laser-beam image recording apparatus for recording images on a light-sensitive sheet medium through irradiation of an information-carrying laser beam, comprising a laser beam generator for emitting a laser beam, a polygonal mirror for directing the laser beam toward a linear zone and deflecting the laser beam to swing repeatedly along the linear zone, roller arrangement for transporting a light-sensitive sheet medium to pass through the linear zone, a sensor for detecting an arrival of the leading edge of the sheet medium at the linear zone, and a control circuit for modulating the laser beam to be generated by the laser beam generator, the control circuit being operative to modulate the laser beam depending on the image to be recorded on a leading portion of a light-sensitive sheet medium before the sensor detects that the leading edge of the sheet medium which has been advancing toward the linear zone reaches the linear zone and to modulate the laser beam depending on the images to be recorded on a portion subsequent to the leading portion of the sheet medium after the sensor detects that the leading edge of the sheet medium advanced toward the linear zone has reached the linear zone.

30 Claims, 9 Drawing Sheets

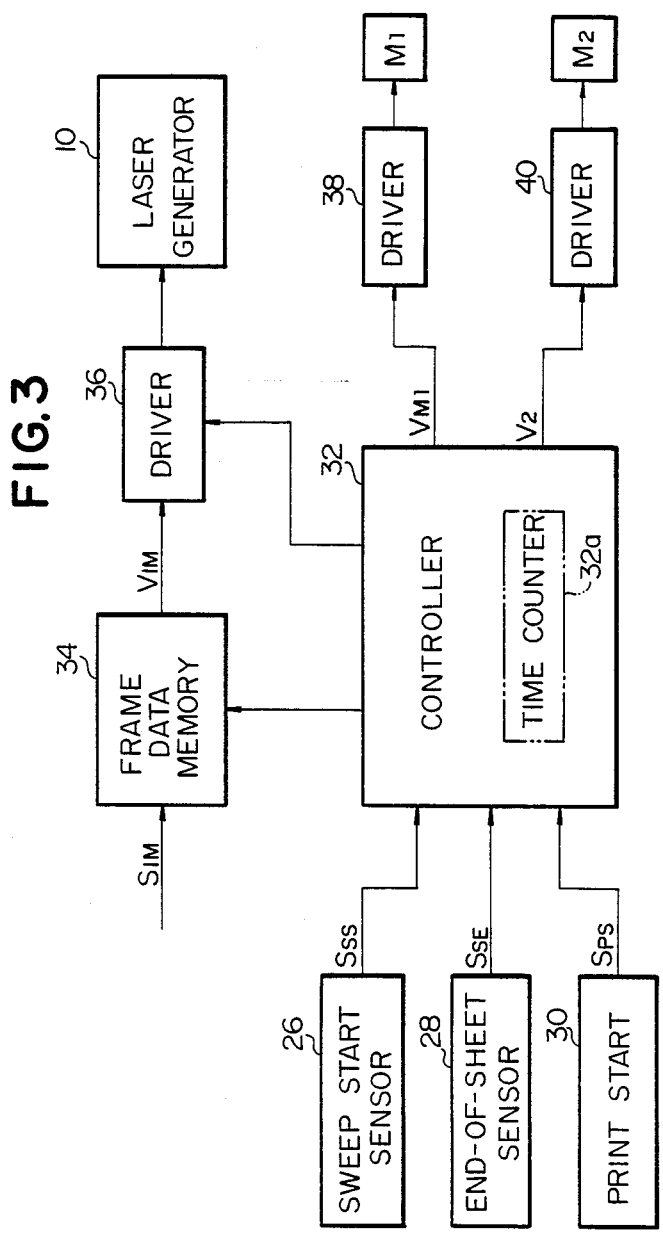

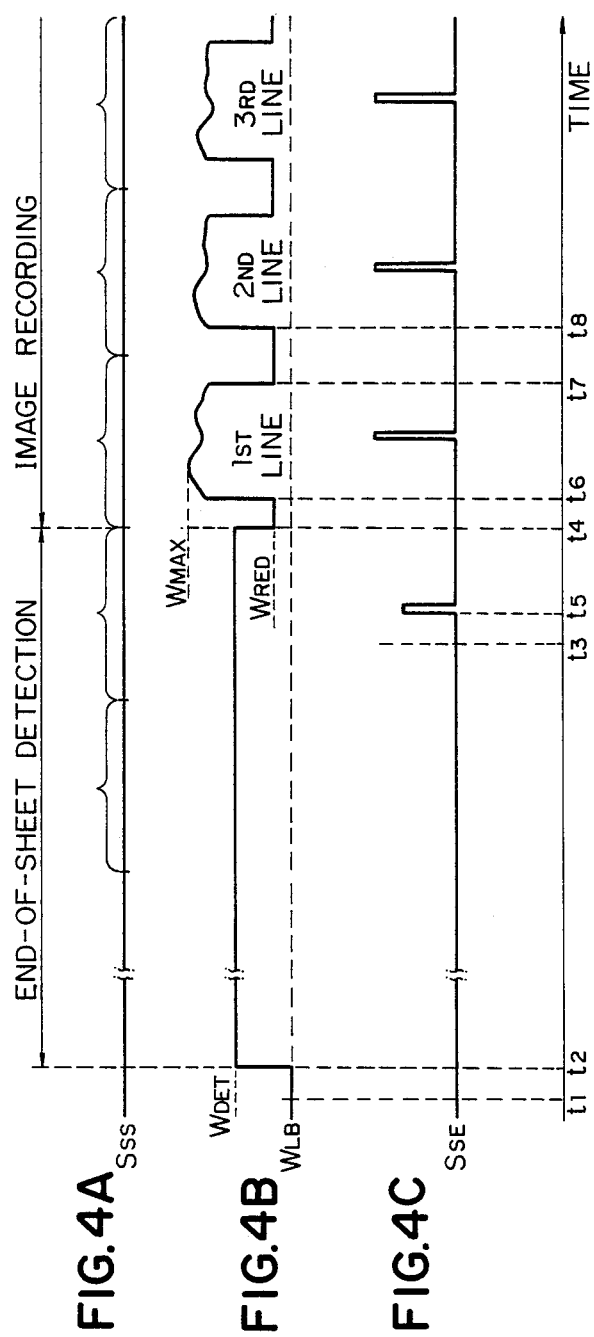

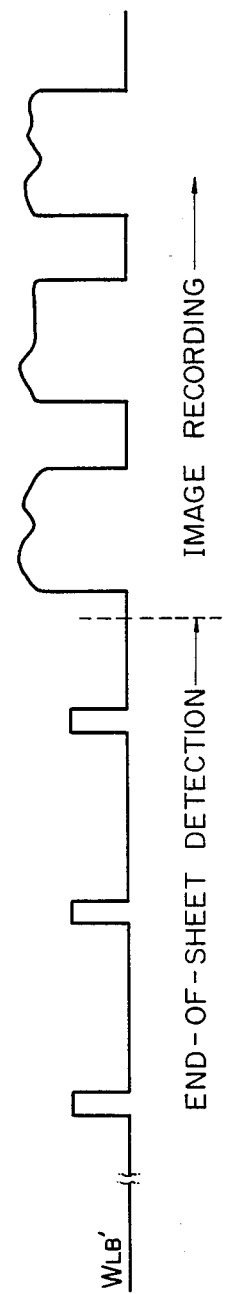

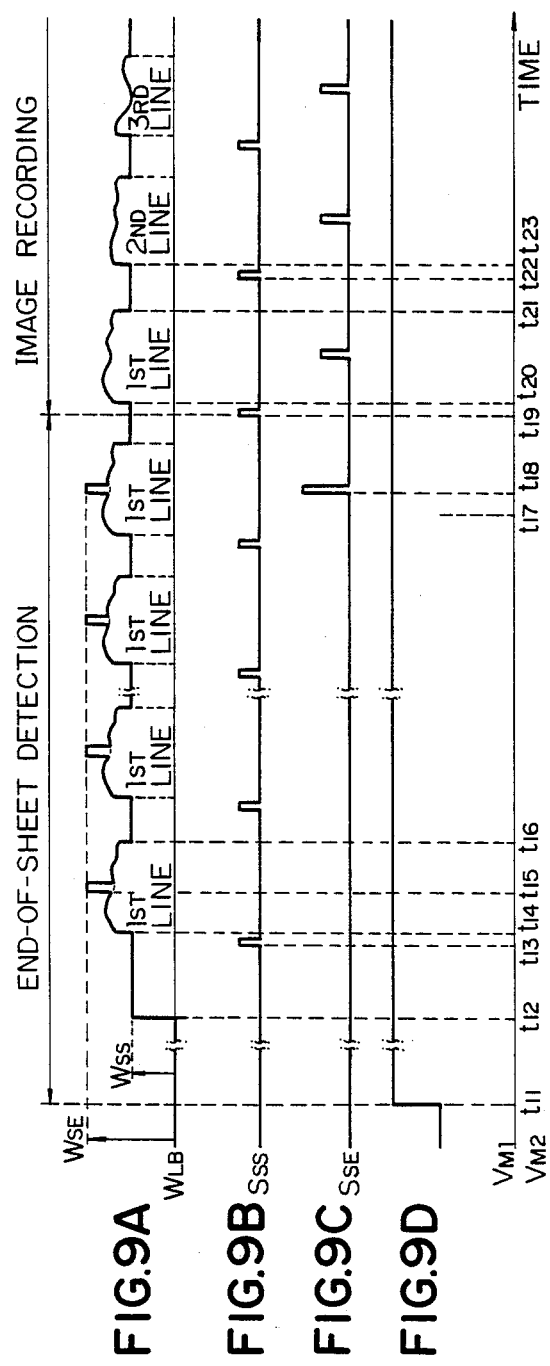

LASER RECORDER WITH SHEET EDGE DETECTION

FIELD OF THE INVENTION

The present invention relates to an image recording apparatus and, more particularly, to a laser-beam image recording apparatus.

BACKGROUND OF THE INVENTION

An image recording apparatus of the type using a laser beam as an image forming means is known and in use. In an image recording apparatus of this type, an image is to be formed on the surface of a light-sensitive sheet medium transported to a predetermined elongated or linear light incidence zone at which the sheet medium is to be irradiated with a laser beam emitted from a laser beam generator located in conjunction with the light incidence zone. Lines of images are thus formed successively on the light-sensitive sheet medium as the sheet medium is passed through the light incidence zone. The sheet medium is driven to travel through the light incidence zone synchronously as lines of images are to be produced one after another on the light-sensitive sheet medium.

In order to enable a light-sensitive sheet medium to be driven to move in synchronism with the irradiation with the laser beam, a known laser-beam image recording apparatus ordinarily has means to detect an arrival of the leading edge of the sheet medium at a predetermined location with respect to the light incidence zone at which the sheet medium is to be irradiated with a laser beam Such detecting means is implemented typically by a mechanically activated switch such as a microswitch or a lead switch located in the path of the light-sensitive sheet medium to be transported toward the light incidence zone of the apparatus. The microswitch or lead switch thus located with respect to the light-sensitive sheet being transported toward the light incidence zone detects an arrival of the leading edge of the sheet medium at a predetermined location with respect to the light incidence zone. In a predetermined period of time after the leading edge of the sheet medium was initially detected by the switch, irradiation of the sheet medium with a laser beam to form a line of images is started on the assumption that the leading edge of the sheet medium has reached the light incidence zone of the apparatus.

A problem is however encountered in a prior-art laser-beam image recording apparatus of this type in that the timing at which the leading edge of a light-sensitive sheet medium is to be detected may subtly vary from one sheet medium to another since such a timing is dictated solely by the mechanically activated switch means. Another important problem of the known laser-beam image recording apparatus is the inability of the switch means to detect the leading edge of a light-sensitive sheet medium because of the arrangement in which the switch means is located at a considerable distance from the light incidence zone of the apparatus.

By reason of these problems, it may happen in a prior-art laser-beam image recording apparatus of the described type that the apparatus fails to start the irradiation of a light-sensitive sheet medium with a laser beam to form a line of images although the leading edge of the sheet medium has already reached the light incidence zone of the apparatus. When this occurs, there will be produced on a leading end portion of the sheet medium an area which has failed to be exposed to a laser beam and which accordingly is to be undesiredly left blank. Where images are to be formed throughout the longitudinal measurement of the light-sensitive sheet medium, it may also happen that the lines of images which should have been formed on a trailing end portion of the sheet medium may fail to be formed thereon. If, on the contrary, the irradiation of the light-sensitive sheet medium with a laser beam is started before the leading edge of the light incidence zone of the apparatus, then it may happen that lines of images which should have been formed on a leading end portion of the sheet medium may fail to be formed thereon or there will be produced on a trailing end portion of the sheet medium an area which has failed to be exposed to the laser beam and which is to be undesiredly left blank.

These problems may be alleviated or even practically eliminated if improvements are made so that a light-sensitive sheet medium is to be driven to travel at a more precisely controlled velocity and the sheet medium is to be irradiated at more precisely controlled timings. If such improvements are made successfully, however, still another problem is encountered in a prior-art laser-beam image recording apparatus of the described type, which results from the fact that the light-sensitive sheet media to be used, which are ordinarily provided in the form of standard-sized sheets of paper, are subject to fluctuations in size. Where a roll of paper consisting of a continuous strip of paper is used and is cut into sheets of a desired longitudinal measurement, the resultant sheets of paper will be subject fluctuations in the longitudinal measurement thereof due to the insufficient accuracy in cutting the rolled sheet. If a sheet medium has a length less than the desired longitudinal measurement, some lines of images may fail to be formed on the sheet medium and if, conversely, than the sheet medium has a length greater than the desired longitudinal measurement, the sheet medium may have an unexposed trailing end. Essentially similar problems will arise if the light-sensitive sheet media to be used have lateral measurements which fluctuate from one sheet medium to another. Missing of some lines of images or formation of an unwanted blank area may also be caused if the light-sensitive sheet medium passed to the light incidence zone of the apparatus skews through the zone.

SUMMARY OF THE INVENTION

It is, accordingly, an important object of the present invention to provide an improved laser-beam image recording apparatus particularly featuring detecting means capable of precisely and reliably detecting the leading edge of a light-sensitive sheet medium which has reached a predetermined location or elongated light incidence zone of the apparatus.

It is another important object of the present invention to provide an improved laser-beam image recording apparatus in which formation of images on a light-sensitive sheet medium with the agency of a laser beam is controlled so that there will not be caused the missing of some lines of images or the formation of an unwanted blank area on the light-sensitive sheet medium.

In accordance with the present invention, these object are accomplished in a laser-beam image recording apparatus for recording images on a light-sensitive sheet medium through irradiation of an information-carrying laser beam modulated depending on the image to be recorded by the beam, comprising (a) laser beam generating means for emitting a laser beam, (b) means for directing the laser beam toward a linear light incidence zone and deflecting the laser beam to swing repeatedly along the linear light incidence zone, (c) means for transporting a light-sensitive sheet medium to pass through the linear light incidence zone, (d) detecting means for detecting an arrival of the leading edge of the sheet medium at the linear light incidence zone, the detecting means including a sensor for producing an output signal responsive to the laser beam incident on the linear light incidence zone, the detecting means being operative to detect the arrival of the leading edge of the sheet medium at the linear light incidence zone on the basis of the signal, (e) the laser beam generating means having a first state operative to generate a laser beam for enabling the detecting means to detect the leading edge of a light-sensitive sheet medium, and a second state operative to generate the information-carrying laser beam, and (f) control means for controlling the laser beam generating means, the control means being operative to maintain the laser beam generating means in the first state before the detecting means detects that the leading edge of a light-sensitive sheet medium which has been advancing toward the linear light incidence zone reaches the linear light incidence zone and to shift the laser beam generating means from the first state into the second state after the detecting means detects that the leading edge of the light-sensitive sheet medium advanced toward the linear light incidence zone has reached the light incidence zone.

In accordance with another outstanding aspect of the present invention, there is provided a laser-beam image recording apparatus for recording images on a light-sensitive sheet medium through irradiation of an information-carrying laser beam, comprising (a) laser beam generating means for emitting a laser beam, (b) means for directing the laser beam toward a linear light incidence zone and deflecting the laser beam to swing repeatedly along the linear light incidence zone, (c) means for transporting a light-sensitive sheet medium to pass through the linear light incidence zone, (d) detecting means for detecting an arrival of the leading edge of the sheet medium at the linear light incidence zone, and (e) beam modulating means for modulating the laser beam to be generated by the laser beam generating means, the beam modulating means being operative to modulate the laser beam depending on the image to be recorded on a leading portion of a light-sensitive sheet medium before the detecting means detects that the leading edge of the light-sensitive sheet medium which has been advancing toward the linear light incidence zone reaches the light incidence zone and to modulate the laser beam depending on the images to be recorded on a portion subsequent to the leading portion of the light-sensitive sheet medium after the detecting means detects that the leading edge of the light-sensitive sheet medium advanced toward the linear light incidence zone has reached the light incidence zone.

In accordance with still another outstanding aspect of the present invention, there is provided a laser-beam image recording apparatus for recording images on a light-sensitive sheet medium through irradiation of an information-carrying laser beam modulated depending on the image to be recorded by the beam, comprising (a) laser beam generating means for emitting a laser beam, (b) means for directing the laser beam toward a linear light incidence zone and deflecting the laser beam to swing repeatedly along the linear light incidence zone, (c) means for transporting a light-sensitive sheet medium to pass through the linear light incidence zone, (d) detecting means for detecting an arrival of the leading edge of the sheet medium at the linear light incidence zone, the detecting means including a sensor for producing an output signal responsive to the laser beam directed to a predetermined location with respect to the direction in which the laser beam is incident on the linear light incidence zone, the detecting means being operative to detect the arrival of the leading edge of the sheet medium at the light incidence zone on the basis of the signal, and (e) control means for controlling the laser beam generating means, the control means being operative to control the laser beam generating means such that the laser beam is generated by the laser beam generating means at a timing at which the laser beam incident on the linear light incidence zone reaches the predetermined point before the detecting means detects that the leading edge of a light-sensitive sheet medium which has been advancing toward the linear light incidence zone reaches the light incidence zone and that laser beam generating means generates the information-carrying laser beam after the detecting means detects that the leading edge of the light-sensitive sheet medium advanced toward the linear light incidence zone has reached the light incidence zone.

BRIEF DESCRIPTION OF THE DRAWINGS

The features and advantages of a laser-beam image recording apparatus according to the present invention will be more clearly appreciated from the following description taken in conjunction with the accompanying drawings in which:

FIG. 3 is a block diagram showing the general circuit arrangement of a preferred form of control circuit which may be further included in the image recording apparatus embodying the present invention particularly for controlling a laser beam generator and mechanical drive means also included in the apparatus;

FIGS. 4A, 4B 4C are timing charts respectively showing examples of the waveforms of signals which may appear in the control circuit illustrated in FIG. 3;

FIG. 5 is a timing chart showing another example of the waveform of a radiation power output from the laser beam generator included in the arrangement illustrated in FIG. 1;

FIGS. 9A, 9B, 9C and 9D are timing charts respectively showing examples of the waveforms of signals which may appear in the control circuit illustrated in FIG. 8.

DESCRIPTION OF THE PREFERRED EMBODIMENTS

Figure 1:
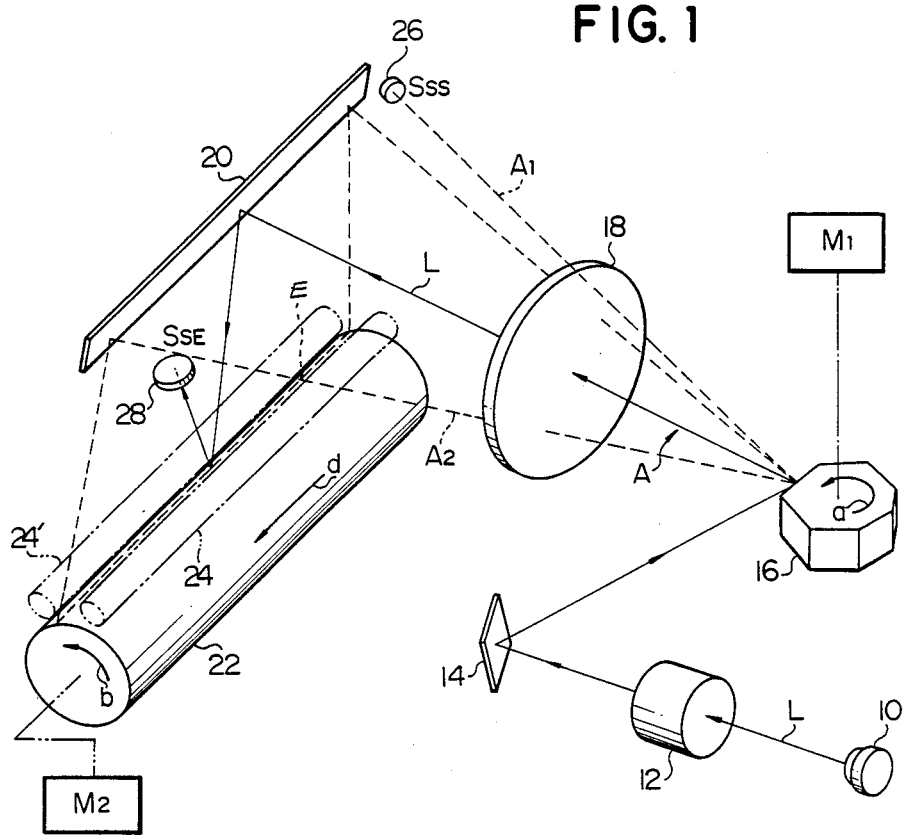
FIG. 1 is a schematic perspective view showing some major functional component elements and units arranged in conjunction with a light incidence zone of a laser-beam image recording apparatus embodying the present invention.
Figure 2:
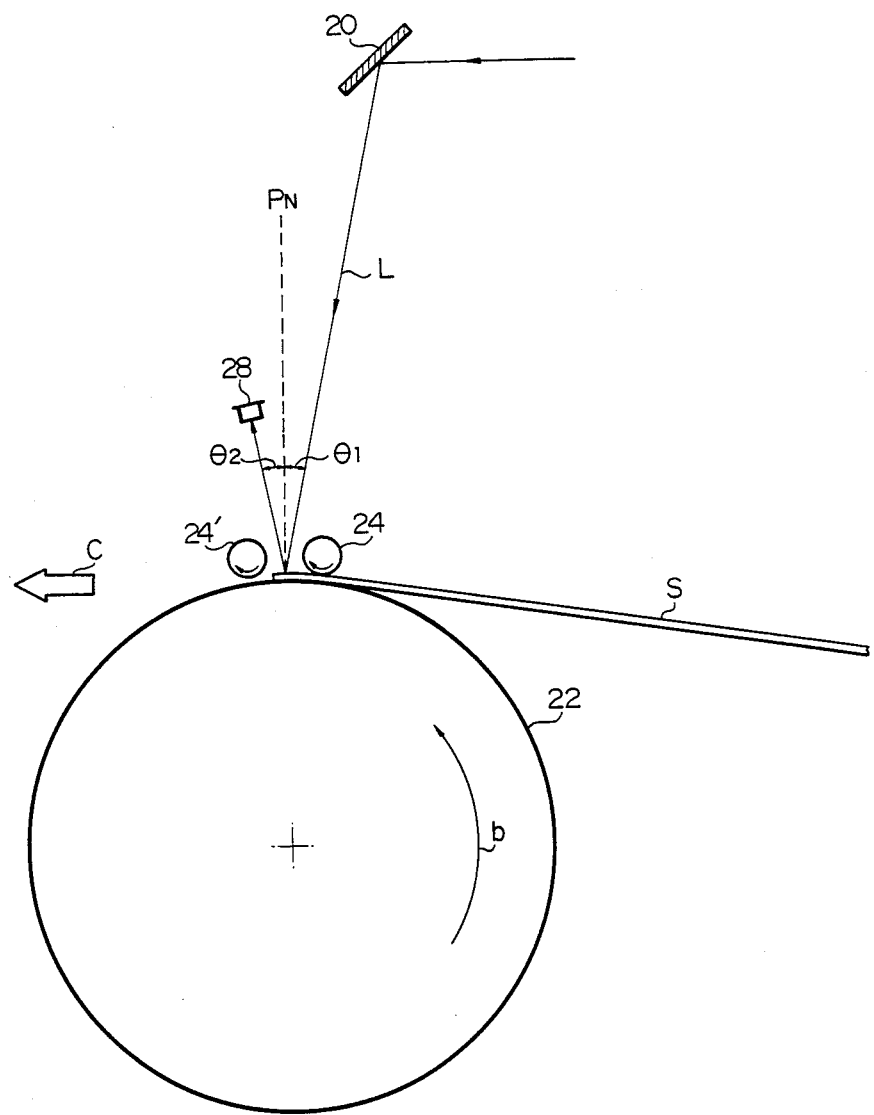
FIG. 2 is a schematic side elevation view showing, to an enlarged scale, the arrangement in which an end-of-sheet sensor forming part of the image recording apparatus embodying the image recording apparatus embodying the present invention is located with respect to a transport drum also included in the apparatus.

In FIGS. 1 and 2 of the drawings are shown some major functional component elements and units arranged in conjunction with an elongated or linear light incidence zone of a laser-beam image recording apparatus embodying the present invention. In the arrangement herein shown, the linear light incidence zone is shown represented by an imaginary line E which is assumed to extend laterally within the image recording apparatus embodying the present invention.

Referring first to FIG. 1, the laser-beam image recording apparatus embodying the present invention comprises a laser beam generator 10 of, typically, the semiconductor laser radiation type from which is emitted an information-carrying laser beam L modulated with image data signals supplied from a suitable image data signal supply source. The image data signal supply source used in a laser-beam image recording apparatus of the type to which the present invention generally appertains is well known in the art and is rather immaterial to the subject matter of the present invention and, as such, will not be herein shown.

The information-carrying laser beam L emitted from the semiconductor laser beam generator 10 is collimated through a collimator lens 12 which is located in the path of light directed from the laser beam generator 10. The collimated beam of laser L emanating from the collimator lens 12 is reflected at a certain angle at a reflector mirror 14 and is re-directed toward a polygonal mirror 16. The polygonal mirror 16 is positioned to have a center axis normal to the plane on which a beam of light is to be incident on and re-directed from the mirror 16 and rotatable in the direction of arrow a about the center axis thereof. The polygonal mirror 16 has a plurality of reflective faces arranged symmetrically about the center axis of the mirror 16 so that one of the reflective faces is to be located in the path of light from the reflector mirror 14. With the polygonal mirror 16 driven for rotation at a fixed velocity in the direction of the arrow a, the beam of light L directed from the reflector mirror 14 is thus incident on one of the reflective faces of the polygonal mirror 16 and is deflected to swing in one direction on the plane transverse to the center axis of the polygonal mirror 16. The plane on which a beam of light is to be incident on and re-directed from the mirror 16 is arranged to be substantially parallel with the elongated light incidence zone E of the apparatus.

In the arrangement herein shown, the polygonal mirror 16 is assumed to be driven for counterclockwise rotation about the center axis of the mirror 16 by suitable drive means which is herein assumed to include a mirror drive motor $M_1$. As the polygonal mirror 16 is thus for rotation about the center axis thereof, the information-carrying laser beam L incident on one, or the currently effective one, of the reflective faces of the mirror 16 is deflected to swing from the right end toward the left end of a beam deflection range A diverging from the currently effective reflective face of the mirror 16 on the plane on which the beam of light from the reflector mirror 14 is incident on and redirected from the mirror 16.

The beam of light L reflected from the polygonal mirror 16 is projected through an F8 lens 18 and is directed toward an elongated reflector mirror 20 which extends in parallel with the light incidence zone E, viz., the beam deflection range A diverging from the polygonal mirror 16. Thus, the beam of light L reflected from the currently effective reflective face of the polygonal mirror 16 and deflected to swing from the right end toward the left end of the beam deflection range A sweeps on the reflector mirror 20 from the vicinity of the right end of the mirror 20 toward the other. The right and left ends of the beam deflection range A as herein referred to are the side ends of the range A as viewed from the polygonal mirror 16 toward the reflector mirror 20. Considering that the beam of light L incident on the reflector mirror 20 is deflected to sweep on the reflector mirror 20 from the vicinity of the right end of the mirror 20 toward the left end, the right end and left end of the beam deflection range A will be herein referred to as sweep starting end $A_1$ and sweep terminating end $A_2$, respectively, of the range A.

The information-carrying laser beam L reflected from the reflector mirror 20 travels toward a transport drum 22 having a center axis parallel with the elongated light incidence zone E and rotatable about the center axis in the direction of arrow b. The transport drum 22 has a matted or otherwise light-absorptive outer peripheral surface which per se thus absorbs a major portion of the light incident thereon. The light incidence zone E of the apparatus is located in close proximity to the peripheral surface of the transport drum 22. The transport drum 22 is driven for rotation about the center axis thereof at a constant velocity by suitable drive means which is herein assumed to include a main drive motor $M_2$.

In association with the transport drum 22 is provided a pair of nip rollers 24 and 24' each having an axis of rotation parallel with the center axis of the transport drum 22. These nip rollers 24 and 24' are located also in proximity to the peripheral surface of the transport drum 22 and are located on both sides of the elongated light incidence zone E in the direction of travel c of a light-sensitive sheet medium S as will be better seen from FIG. 2. As shown in FIG. 2, the light-sensitive sheet medium S transported to the light incidence zone E of the apparatus is pressed tangentially against the peripheral surface of the transport drum 22 by means of the nip rollers 24 and 24'. A spot of light is produced on the surface of the sheet medium S thus pressed tangentially against the peripheral surface of the transport drum 22 and is moved from the vicinity of the right end of the sheet medium S toward the other as indicated by arrow d in FIG. 1 by the beam of light L reflected from the reflector mirror 20. A line of images is accordingly formed on the surface of the light-sensitive sheet medium S along the light incidence zone E by the spot of the information-carrying laser beam L thus moved laterally of the sheet medium S. As well known in the art, the light-sensitive sheet medium S is provided typically in the form of a film which consists of a substrate coated with a silver salt such as silver halide.

The light-sensitive sheet medium S is driven to travel to and through the light incidence zone E of the apparatus by suitable drive means which includes the main drive motor $M_2$ forming part of the drive means for the transport drum 22.

At or in close proximity to the sweep starting end $A_1$ of the beam deflection range A diverging from the polygonal mirror 16 is provided a sweep start end sensor 26 which is adapted to respond to the beam of light directed along the sweep starting end $A_1$ of the beam deflection range A. In the shown arrangement, this sweep start end sensor 26 is assumed to have a light-receiving face located on a plane parallel with and close to the reflective surface of the reflector mirror 20. The sweep start end sensor 26 is implemented by an optoelectric transducer and is operative to produce a sweep start signal $S_{SS}$ on the basis of which is to be controlled the timing at which the recording of lines of images on a light-sensitive sheet medium is to be started, as will described as the description proceeds.

As will be seen from FIG. 2, the arrangement including the reflector mirror 20 and transport drum 22 is such that the beam of light L reflected from the reflector mirror 20 is incident on the elongated light incidence zone E of the apparatus at a predetermined angle $\theta_1$ with respect to a prescribed plane $P_N$ normal to the peripheral surface of the transport drum 22 and passing through the center axis of the transport drum 22. In conjunction with such a predetermined angle of incidence of light onto the transport drum 22 is provided an end-of-sheet sensor 28 which is located to be sensitive to a beam of light advancing away from the peripheral surface of the transport drum 22 at a predetermined angle $\theta_2$ with respect to the plane $P_N$ normal to the peripheral surface of the transport drum 22. The predetermined angle $\theta_2$ is defined on the opposite side of the plane $P_N$ to the predetermined angle $\theta_1$ at which a beam of light is to be incident on the light incidence zone E of the apparatus and is selected to be equal to the angle $\theta_1$. In the presence of a light-sensitive sheet medium S extending through the light incidence zone E, the beam of light L incident on the sheet medium S at the angle $\theta_1$ with respect to the prescribed plane $P_N$ normal to the peripheral surface of the transport drum 22 and reflected from the sheet medium S at the angle $\theta_2$ with respect to the plane $P_N$ is detected by the end-of-sheet sensor 28 when the beam of light L passes through any point of the light incidence zone E while the beam is moving from one end of the light incidence zone to toward the other. In the arrangement herein shown, the end-of-sheet sensor 28 is assumed to be located to approximately correspond to the middle point of the light incidence zone E so that, while the beam is being deflected to swing from the vicinity of one end of the light incidence zone to toward the other, the beam of light reflected from a light-sensitive sheet medium S is captured by the end-of-sheet sensor 28 when the beam of light directed to the sheet medium S passes through the middle point of the elongated light incidence zone E.

In the absence of a light-sensitive sheet medium extending through the light incidence zone E, the beam of light L reflected from the reflector mirror 20 is incident on the matted or otherwise light-absorptive peripheral surface of the transport drum 22 and is thus in a major proportion absorbed into the peripheral surface of the drum 22. Thus, the end-of-sheet sensor 28 is not responsive to the beam of light L incident on the transport drum 22 in the absence of a sheet medium extending along the elongated light incidence zone E and is enabled to respond to the incident beam of light L when, and only when, the leading edge of a light-sensitive sheet medium S advanced toward the light incidence zone E has reached the light incidence zone E. The end-of-sheet sensor 28 is accordingly capable of detecting an arrival of the leading edge of a light-sensitive sheet medium at the light incidence zone E of the apparatus and is implemented by an optoelectric transducer operative to produce an end-of-sheet detect signal $S_{SE}$ which is also used to control the timing at which the recording of lines of images on a light-sensitive sheet medium is to be started.

FIG. 3 shows a preferred form of control circuit which may be used in the laser-beam image recording apparatus embodying the present invention particularly for controlling the laser beam generator 10 and the mirror and drum drive motors $M_1$ and $M_2$ of the apparatus hereinbefore described with reference to FIGS. 1 and 2.

The control circuit herein shown is enabled by a signal $S_{PT}$ produced from a print start switch 30 also included in the apparatus though not specifically shown in the drawings. With the print start switch 30 manually depressed, the apparatus under consideration is switched in and the signal $S_{PT}$ is supplied to a controller unit 32 so that the control circuit herein shown is enabled to operate. The controller unit 32 is also responsive to the sweep start signal $S_{SS}$ output from the sweep start end sensor 26 and the end-of-sheet detect signal $S_{SE}$ output from the end-of-sheet sensor 28. The controller unit 32 has incorporated therein a time counter 32a to be enabled particularly by the signal $S_{SS}$ output from the sweep start end sensor 26 for starting the counting of time after the signal $S_{SS}$ is received from the sweep start end sensor 26.

The controller unit 32 has an output terminal connected to an enable terminal of a frame data memory 34 implemented by a random access memory into which is to be stored a set of coded image data signals $S_{IM}$. The set of coded image data signals $S_{IM}$ is representative of the image information to be recorded on a single page of sensitized sheet medium and consists of a plurality of lines of image data. As has been noted, such coded image data signals $S_{IM}$ are supplied from a suitable image data signal supply source (not shown). The coded image data signals $S_{IM}$ thus stored in the frame data memory 34 are released for each line of images from the memory 34 and are, upon conversion into analog image data signals $V_{IM}$, supplied to a driver circuit 36 having a control terminal connected to the controller unit 32. Responsive to the analog image data signals $V_{IM}$ received from the frame data memory 34, the driver circuit 36 activates the semiconductor laser beam generator 10, from which is thus emitted an information-carrying laser beam L modulated with the analog image data signals $V_{IM}$ supplied from the frame data memory 34.

The controller unit 32 further has output terminals respectively connected to a driver circuit 38 for the mirror drive motor $M_1$ and a driver circuit 40 for the main drive motor $M_2$. The controller unit 32 is operative to supply an analog signal $V_{M1}$ to activate the mirror drive motor $M_1$ by the driver circuit 38 and an analog signal $V_{M2}$ to activate the main drive motor $M_2$ by the driver circuit 50.

FIGS. 4A, 4B and 4C are timing charts respectively showing examples of the waveforms of signals which may appear in the control circuit hereinbefore described with reference to FIG. 3. FIG. 4A shows an example of the waveform of the sweep start signal $S_{SS}$ output from the sweep start end sensor 26 included in the control circuit of FIG. 3 and FIG. 4C shows an example of the waveform of the end-of-sheet detect signal $S_{SE}$ output from the end-of-sheet sensor 28 included in the control circuit of FIG. 3. Shown in FIG. 4B is an example of the waveform of the radiation power output $W_{LB}$ from the semiconductor laser beam generator 10 included in the arrangement described with reference to FIGS. 1 and 2.

The major modes of operation of the laser-beam image recording apparatus constructed and arranged as hereinbefore described will now be clarified with respect to these timing charts.

The image recording apparatus embodying the present invention is switched in with the print start switch 30 manually turned on by the operator. The apparatus being thus switched in with the print start switch 30 closed as at time $t_1$, the controller unit 32 outputs a signal $V_{M1}$ to enable the driver circuit 38 to actuate the polygonal mirror drive motor $M_1$ into operation. The polygonal mirror drive motor $M_1$ being thus actuated into operation, the polygonal mirror 16 is driven for rotation in the direction of the arrow a. In a certain period of time after the polygonal mirror drive motor $M_1$ is actuated into operation at time $t_1$, the operation of the motor $M_1$ will be stabilized and as a consequence the polygonal mirror 16 will be driven for rotation at a constant velocity as at time $t_2$.

At time $t_2$, the controller unit 32 supplies to the driver circuit 36 for the laser beam generator 10 an instruction signal to activate the laser beam generator 10 to emit a beam of light with a radiation power output of a level $W_{DET}$ prescribed for the purpose of detecting the leading edge of a light-sensitive sheet medium S which may be supplied to the elongated light incidence zone E of the apparatus. The radiation power output of the level $W_{DET}$ used for the detection of the leading edge of a light-sensitive sheet medium S is selected to be significantly less than the maximum power output level $W_{MAX}$ available of the laser beam generator 10 as will be seen from the waveform indicated in FIG. 4B. The use of the radiation power output of the level $W_{DET}$ for the detection of the leading edge of a light-sensitive sheet medium will prove advantageous not only for reducing the power consumption during end-of-sheet detect mode of operation of the apparatus but for the purpose of minimizing the risk of causing the fogging on the sheet medium.

Simultaneously when the laser beam generator 10 starts emission of the end-of-sheet detecting laser beam at time $t_2$, the controller unit 32 outputs a signal $V_{M2}$ to enable the driver circuit 40 to actuate the main drive motor $M_2$ into operation. The main drive motor $M_2$ being thus actuated into operation, the transport drum 22 is initiated into operation to turn in the direction of the arrow b and concurrently a light-sensitive sheet medium S is driven to advance toward the elongated light incidence zone E located in the vicinity of the transport drum.

The end-of-sheet detecting laser beam emitted from the laser beam generator 10 is incident on one of the reflective faces of the polygonal mirror 16 rotating about the center axis thereof and is deflected to swing from the right end toward the left end of the beam deflection range A diverging from the currently effective reflective face of the mirror 16. The beam of light thus reflected from the polygonal mirror 16 is projected through the F$\theta$ lens 18 and is directed toward the reflector mirror 20 and sweeps on the reflector mirror 20 from the vicinity of the right end of the mirror 20 toward the other. As the polygonal mirror 16 is driven for rotation in the direction of the arrow a, the beam of light reflected from the polygonal mirror 16 and projected by the lens 18 sweeps repeatedly on the reflector mirror 20. The beam of light thus sweeping on the reflector mirror 20 is detected by the sweep start end sensor 26 each time the beam of light is deflected to swing from the sweep starting end $A_1$ of the beam deflection range A. Before the light-sensitive sheet medium S reaches a position having its leading end located over the elongated light incidence zone E, the sweep start end sensor 26 is thus operative to produce the sweep start signal $S_{SS}$ each time the beam of light reflected from the polygonal mirror 16 is deflected to swing from the sweep starting end $A_1$ to the sweep terminating end $A_2$ of the beam deflection range A.

The end-of-sheet detecting laser beam reflected from the reflector mirror 20 is incident on the transport drum 22 and sweeps on the peripheral surface of the transport drum 22 repeatedly from the vicinity of one axial end of the drum 22 toward the other in the direction of arrow d. In the absence of a sheet medium located over the transport drum 22, the light thus incident on the transport drum 22 is mostly absorbed by the matted or otherwise light-absorptive peripheral surface of the drum 22, there is no light received by the end-of-sheet sensor 28 from the transport drum 22 so that there is no end-of-sheet detect signal $S_{SE}$ output from the end-of-sheet sensor 28, as will be seen from the waveform indicated in FIG. 4C. sheet detect signal $S_{SE}$ output from the end-of-sheet sensor 28, as will be seen from the waveform indicated in FIG. 4C.

At time $t_3$ after the transport drum 22 is initiated into operation and the light-sensitive sheet medium S driven to travel toward the transport drum 22, the sheet medium S will reach a position having its leading end located over the elongated light incidence zone E between the nip rollers 24 and 24' as indicated in FIG. 2. After the leading edge of the light-sensitive sheet medium S has thus arrived at the elongated light incidence zone E, the end-of-sheet detecting laser beam which has been incident on the matted or otherwise light-absorptive peripheral surface of the rotating transport drum 22 from the reflector mirror 20 is partially reflected from the sheet medium S and is detected by the end-of-sheet sensor 28 when the beam of light reflected from the sheet medium passes through the end-of-sheet sensor 28 located to approximately correspond to the middle point of the elongated light incidence zone E. The end-of-sheet sensor 28 is accordingly activated to produce the end-of-sheet detect signal $S_{SE}$ at time $t_4$ as indicated by the waveform of FIG. 4C, indicating that the leading edge of the light-sensitive sheet medium S has reached the light incidence zone E of the apparatus.

At the point of time it is thus detected that the leading edge of the light-sensitive sheet medium S has reached the elongated light incidence zone E, the end-of-sheet detecting laser beam reaches the sweep starting end $A_1$ of the range A as at time $t_4$, the controller unit 32 responsive to the sweep start signal $S_{SS}$ from the sweep start end sensor 26 supplies to the driver circuit 36 for the laser beam generator 10 an instruction signal to activate the laser beam generator 10 to emit a beam of light with the reduced radiation power output of a reduced level $W_{RED}$. This reduced radiation power output level $W_{RED}$ of the laser beam generator 10 is lower than the radiation power output level $W_{DET}$ for the generation of the end-of-sheet detecting laser beam and is selected to be such that the resultant beam of light could not be sensed by a light-sensitive sheet medium but can be assuredly detected by the sweep start end sensor 26.

Responsive to the sweep start signal $S_{SS}$ output from the sweep start end sensor 26 at time $t_4$, the time counter 32a incorporated in the controller unit starts counting of time until a prescribed period of time lapses after time $t_4$. Upon lapse of such a period of time as at time $t_6$, the controller unit 32 supplies an enable signal to the frame data memory 34 to enable the memory 34 to release signals for the recording of a single line of images out of the image data signals $S_{IM}$ which have been stored therein. The image data signals $S_{IM}$ thus released from the frame data memory 34 are, upon conversion into analog image data signals $V_{IM}$, supplied to the driver circuit 36 for the laser beam generator 10. In response to the analog image data signals $V_{IM}$ received from the frame data memory 34, the driver circuit 36 activates the semiconductor laser beam generator 10, from which is thus emitted an information-carrying laser beam L modulated with the analog image data signals $V_{IM}$ supplied from the frame data memory 34.

A spot of light is now produced on the surface of the sheet medium S pressed tangentially against the peripheral surface of the transport drum 22 and is moved from the vicinity of the right end of the sheet medium S toward the other as indicated by arrow d in FIG. 1 by the information-carrying laser beam L incident on the surface of the sheet medium S. A line of images is thus formed on the surface of the light-sensitive sheet medium S along the elongated light incidence zone E by the information-carrying laser beam L being deflected to swing from the sweep starting end $A_1$ of the beam deflection range A. At a predetermined timing before the beam of light L reaches the sweep terminating end $A_2$ of the beam deflection range A, the controller unit 32 supplies to the driver circuit 36 an instruction signal to activate the laser beam generator 10 to emit a beam of light with the radiation power output of the reduced level $W_{RED}$ as at time $t_7$.

After the first line of images is recorded, the controller unit 32 supplies an enable signal to the frame data memory 34 for a second time and activates the laser beam generator 10 to emit a new information-carrying laser beam L as at time $t_8$. The second line of images is now formed on the surface of the light-sensitive sheet medium S by the newly emitted information-carrying laser beam L.

In these manners, a line of images is formed on the surface of the light-sensitive sheet medium S each time the information-carrying laser beam L is deflected to swing from the sweep starting end $A_1$ to the sweep terminating end $A_2$ of the beam deflection range A, as will be seen from FIG. 4A. The end-of-sheet sensor 28 also outputs the end-of-sheet detect signal $S_{SE}$ each time the information-carrying laser beam L is deflected to swing from the sweep starting end $A_1$ to the sweep terminating end $A_2$ of the beam deflection range A. Only the first one of the series of signals $S_{SE}$ thus output from the end-of-sheet sensor 28, viz., the signal $S_{SE}$ produced at time $t_4$, is useful in the control circuit and is utilized for the control of the timing at which the recording of images on a sheet medium is to be started.

As will have been understood from the foregoing description, the embodiment of a laser-beam image recording apparatus according to the present invention as hereinbefore described is characterized, inter alia, in that an end-of-sheet detecting laser beam is emitted with the radiation power output of a level reduced for the purpose of detecting the leading edge of a light-sensitive sheet medium being supplied to the elongated light incidence zone and, once the arrival of the leading edge of the sheet medium at the light incidence zone, an information-carrying laser beam in lieu of the end-of-sheet detecting beam is applied to the light-sensitive sheet medium. An arrival of the leading edge of a light-sensitive sheet medium can thus be detected to a degree of accuracy which substantially corresponds to the width of the line delineated by the spot of the end-of-sheet detecting laser beam incident on the transport drum 22 along the elongated light incidence zone E of the apparatus.

In addition, it may happen for one reason or another that any one of the component elements forming the optical system of the apparatus, such as the laser beam generator 10, lens 12, mirror 14, polygonal mirror 16, lens 18 and mirror 20 is moved undesiredly. When this occurs, there will be caused a change in the position or location of the element with respect to the transport drum 22 and, as a consequence, the beam of light reflected from the reflector mirror 20 might fail to be incident along the elongated light incidence zone E of the apparatus. In such an occasion, however, the leading edge of a light-sensitive sheet medium advanced to the light incidence zone E can be detected accurately and reliably insofar as the light reflected from the mirror 20 is picked up by the end-of-sheet sensor 28.

It may be further noted that the end-of-sheet sensor 28 is located to approximately correspond to the middle point of the elongated light incidence zone E and, for this reason, the leading edge of a light-sensitive sheet medium of any size can be reliably detected by the end-of-sheet sensor 28 even when the sheet medium is advanced to skew through the light incidence zone E of the apparatus. It will be however apparent that the end-of-sheet sensor in a laser-beam image recording apparatus according to the present invention can be located elsewhere with respect to the elongated light incidence zone of the apparatus.

While the end-of-sheet sensor 28 used in each of the embodiments of the present invention as have been hereinbefore described is assumed to be located to approximately correspond to the middle point of the elongated light-sensitive sensitive sheet medium advanced toward the light incidence zone of the apparatus can be detected accurately and reliably, such location of the end-of-sheet sensor 28 is merely by way of example and, as such, it will be apparent that the end-of-sheet sensor in a laser-beam image recording apparatus according to the present invention can be located arbitrarily with respect to the elongated light incidence zone of the apparatus.

While the controller unit 32 in the control circuit shown in FIG. 3 is arranged to control the laser beam generator 10 emit an end-of-sheet detecting laser beam of a fixed amplitude, the semiconductor laser beam generator 10 included in the arrangement described with reference to FIGS. 1 and 2 may be controlled to generate an end-of-sheet detecting laser beam in the form of a series of pulses. FIG. 5 is a timing chart showing an example of the waveform of such a radiation power output $W_{LB}'$ from the semiconductor laser beam generator 10 included in the arrangement described with reference to FIGS. 1 and 2.

Figure 6A:
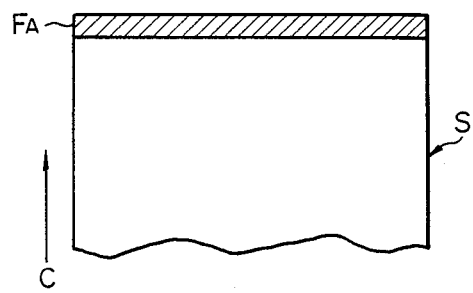
FIGS. 6A, 6B and 6C are fragmentary plan views showing light-sensitive sheet media each having a fogged area produced when irradiated with an end-of-sheet detecting laser beam as when the laser beam generator is controlled to operate by the control circuit illustrated in FIG. 3.
Figure 6B:
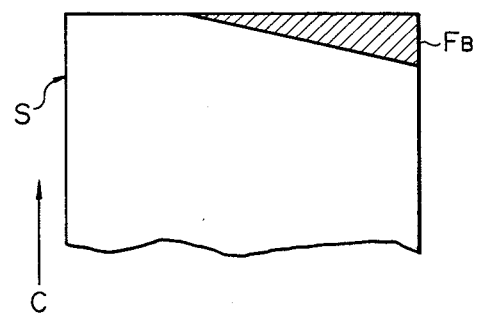

The constant end-of-sheet detecting laser beam generated by the laser beam generator 10 controlled by the controller unit 32 is useful for enabling the end-of-sheet sensor 28 to accurately and reliably detect the leading edge of a light-sensitive sheet medium which has reached the elongated light incidence zone E. Such a constant end-of-sheet detecting laser beam may however cause production of a fogged area $F_A$ along the leading edge of a light-sensitive sheet medium S when the particular area is irradiated with the beam of light, as indicated in FIG. 6A. The fogged area $F_A$ thus produced on the sheet medium S has a width approximately equal to the width of the spot of the beam of light incident on the sheet medium and is ordinarily practically negligible. If, however, it happens that the sheet medium S transported to the light incidence zone E is caused to skew through the light incidence zone E or is deformed irregularly, then there may be produced a more conspicuous fogged area $F_B$ as shown in FIG. 6B. The use of an end-of-sheet detecting laser beam in the form of pulses is useful for avoiding the production of a fogged area along the leading edge of a light-sensitive sheet medium.

The end-of-sheet detecting laser beam in the form of pulses is generated so that the radiation power output from the laser beam generator 10 forms a pulse at a timing the beam of light is directed to the middle point of the elongated light incidence zone E. Upon arrival of the leading edge of a light-sensitive sheet medium S at the light incidence zone E the beam of light thus generated in the form of a pulse is reflected from the sheet medium and is detected by the end-of-sheet sensor 28 located to correspond to the middle point of the elongated light incidence zone E. The pulsewidth of the laser beam thus produced at the middle point of the elongated light incidence zone E can be selected as desired depending on the detection accuracy of the end-of-sheet sensor 28 used and may be selected to correspond to, for example, the time duration required for the recording of a single dot of image. In view, furthermore, of the fact that the timing at which the radiation power output from the laser beam generator 10 is subject to fluctuations in magnitude, it is preferable that the end-of-sheet sensor 28 for use with the end-of-sheet detect laser beam of the pulse form have as large light receiving area as possible so as to take up a possible error which may be caused in the generation of the pulse.

Figure 6C:
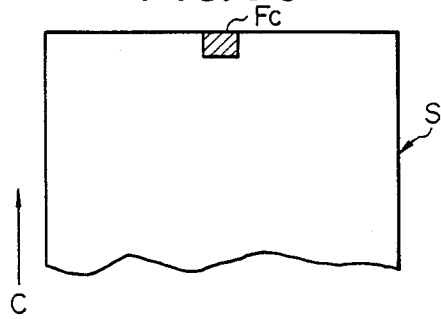

In the presence of a leading end portion of a sheet medium extending through the elongated light incidence zone E, there could be no beam of light incident on the sheet medium S except at the location of the sheet medium corresponding to the middle point of the light incidence zone E. If a leading end portion of the sheet medium S is irradiated with the laser beam in the form of a pulse, there will merely result formation of a fogged area $F_C$ of small spot form located centrally of a leading end portion of the sheet medium S, as shown in FIG. 6C.

The embodiment of the apparatus using the end-of-sheet detecting laser beam in the form of pulses operates similarly in other respects to the embodiment hereinbefore described with reference to FIG. 4. Thus, after the leading edge of the light-sensitive sheet medium S is detected to have reached the light incidence zone E, the laser beam generator 10 is controlled to produce an information-carrying laser beam L in lieu of the end-of-sheet detecting laser beam in the form of pulses, as will be also seen from FIG. 5.

Figure 7:
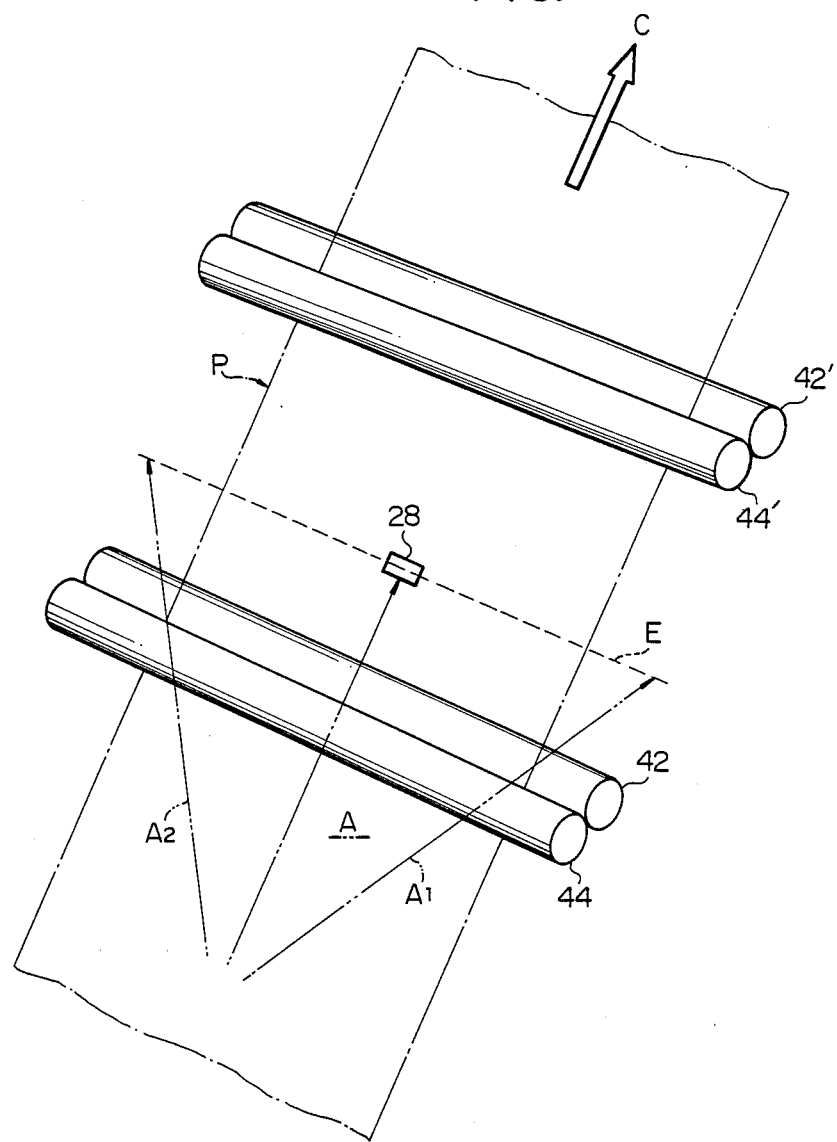
FIG. 7 is a fragmentary perspective view showing the transport drum arrangement of a modification of the embodiment of a laser-beam image recording apparatus according to the present invention as illustrated in FIG. 1.

FIG. 7 shows the transport drum arrangement of a modification of the laser-beam image recording apparatus hereinbefore described with reference to FIGS. 1 and 2.

While the transport drum arrangement in the embodiment of the present invention as hereinbefore described essentially consists of the transport drum 22 and nip rollers 24 and 24', the transport drum arrangement shown in FIG. 7 comprises two pairs of parallel nip rollers, the nip rollers of each pair being in rollable contact with each other. These two pairs of nip rollers consist of a first pair of nip rollers 42 and 44 located ahead of the elongated light incidence zone E of the apparatus and a second pair of nip rollers 42' and 44' located at the rear of the light incidence zone E in the direction of travel c of a light-sensitive sheet medium S. A path of travel P of a light-sensitive sheet medium is thus defined on a plane which extends from the first pair of nip rollers 42 and 44 to the second pair of nip rollers 42' and 44' and which intervenes between the nip rollers of each pair, as indicated by phantom lines.

The reflector mirror 20 from which a beam of light is to be directed toward the elongated light incidence zone E is located on one side of the path of travel P and the end-of-sheet sensor 28 to be responsive to the leading edge of a light-sensitive sheet medium to travel along the path P is located on the other side of the path of travel P. In the arrangement herein shown, the reflector mirror 20 is located on the upper side of the path of travel P and the end-of-sheet sensor 28 located on the lower side of the path of travel P by way of example. The end-of-sheet sensor 28 in the arrangement herein shown is also assumed to be located to approximately correspond to the middle point of the elongated light incidence zone E.

With the arrangement of the nip roller pairs 42/44 and 42'/44' and the end-of-sheet sensor 28 thus located with respect to the path of travel P of a light-sensitive sheet medium, a beam of light directed toward the light incidence zone E is captured by the end-of-sheet sensor 28 when the beam of light passes through the middle point of the elongated light incidence zone E in the absence of a light-sensitive sheet medium moving over the end-of-sheet sensor 28. In the presence of a light-sensitive sheet medium which has reached the light incidence zone E, the beam of light directed toward the end-of-sheet sensor 28 while the beam is moving through the middle point of the light incidence zone E is intercepted by the sheet medium so that there is no laser beam received by the end-of-sheet sensor 28 located below the sheet medium. Thus, the end-of-sheet sensor 28 is responsive to an incoming beam of light in the absence of a light-sensitive sheet medium over the light incidence zone E and is isolated from the incoming light when the leading edge of a light-sensitive sheet medium which has reached the light incidence zone E is detected. Accordingly the end-of-sheet sensor 28 incorporated in the apparatus using the transport drum arrangement of FIG. 7 is operative to output an inverted version ($\overline{S_{SE}}$) of the end-of-sheet signal $S_{SE}$ to be output from the end-of-sheet sensor 28 used in the embodiment hereinbefore described with respect to FIGS. 1 and 2.

The embodiment using such roller and end-of-sheet sensor arrangement will prove advantageous especially where a light-sensitive sheet medium having a relatively low reflection coefficient.

Figure 8:
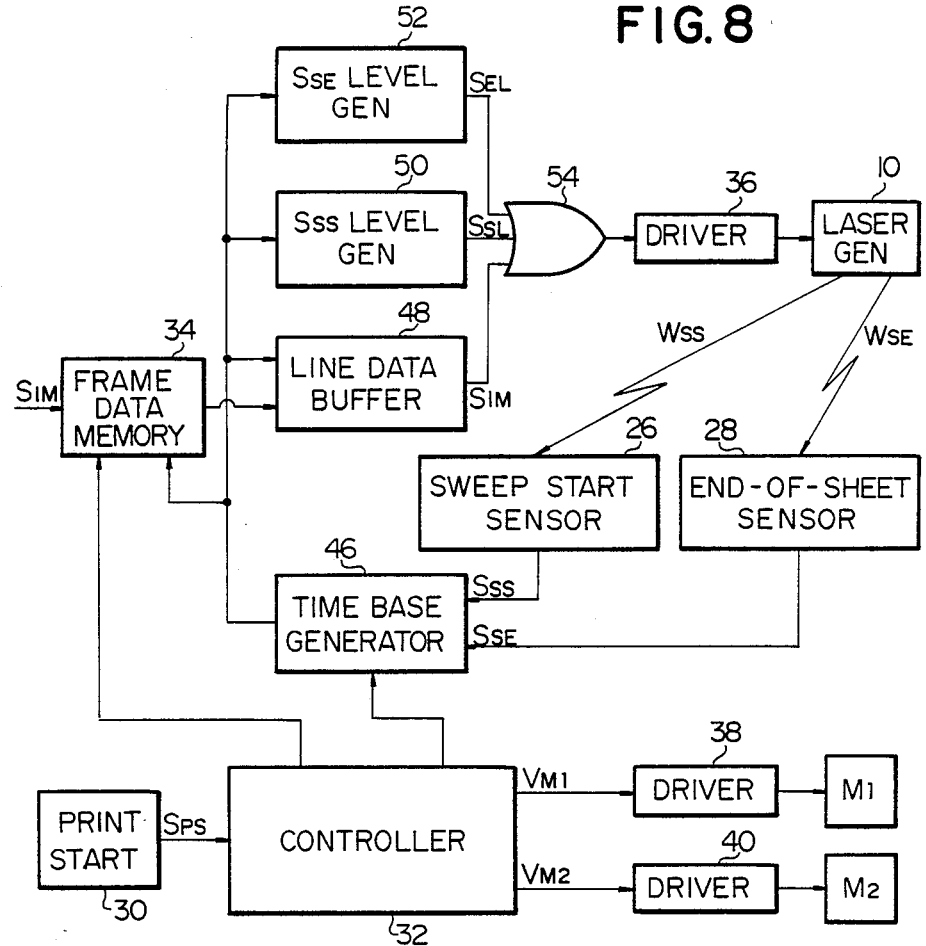
FIG. 8 is a block diagram showing the general circuit arrangement of a control circuit included in another preferred embodiment of a laser-beam image recording apparatus according to the present invention.

FIG. 8 shows a another preferred form of control circuit which may be used in the laser-beam image recording apparatus embodying the present invention as hereinbefore described with reference to FIGS. 1 and 2.

The control circuit herein shown is also enabled by a signal $S_{PT}$ produced from a print start switch 30. The signal $S_{PT}$ is supplied to a controller unit 32 which has an output terminal connected to an enable terminal of a time base circuit 46 responsive to the sweep start signal $S_{SS}$ output from the sweep start end sensor 26 and the end-of-sheet detect signal $S_{SE}$ output from the end-of-sheet sensor 28. The controller unit 32 further has an output terminal connected to an enable terminal of a frame data memory 34 implemented by a random access memory into which is to be stored a set of coded image data signals $S_{IM}$ for the recording of information on a single page of sensitized sheet medium. The coded image data signals $S_{IM}$ thus stored in the frame data memory 34 are supplied to a line data buffer register 48.

The sweep start signal $S_{SS}$ output from the sweep start end sensor 26 is also supplied to a sweep start signal level generator circuit 50 and the end-of-sheet detect signal $S_{SE}$ output from the end-of-sheet sensor 28 is also supplied to an end-of-sheet detect signal level generator circuit 52. The sweep start signal level generator circuit 50 is adapted to produce a signal $S_{SL}$ indicative of a predetermined level $W_{SS}$ of the laser radiation power output to enable the sweep start end sensor 26 to assuredly detect the laser beam emitted from the laser beam generator 10. Similarly, the end-of-sheet detect signal $S_{SE}$ is adapted to produce a signal $S_{EL}$ indicative of a predetermined level $W_{SE}$ level of the laser radiation power output to enable the end-of-sheet sensor 28 to assuredly detect the laser beam emitted from the laser beam generator 10. The level $W_{SE}$ of the laser radiation power output to enable the end-of-sheet sensor 28 to detect the laser beam from the laser beam generator 10 is preferably selected to be higher than the level $W_{SS}$ of the laser radiation power output to enable the sweep start end sensor 26 to detect the laser beam from the laser beam generator 10. This is because of the fact the laser beam from the laser beam generator 10 directly incident on the latter while the laser beam to be incident on the former is once reflected from a light-sensitive sheet medium.

Each of the line data buffer register 48, sweep start signal level generator circuit 50 and end-of-sheet detect signal level generator circuit 52 as well as the frame data memory 34 is enabled to release its respective output signal at a timing dictated by a timing signal supplied from the time base circuit 46.

The line data buffer register 48, sweep start signal level generator circuit 50 and end-of-sheet detect signal level generator circuit 52 have their respective output terminals connected through a three-input OR gate circuit 54 to a driver circuit 36 for the laser beam generator 10. Thus, the driver circuit 36 activates the laser beam generator to emit a laser beam with the laser radiation power output of the level $W_{SS}$ enabling the sweep start end sensor 26 to assuredly detect the laser beam emitted from the laser beam generator 10 when the signal $SS_L$ supplied from the sweep start signal level generator circuit 50 is transmitted through the OR gate circuit 54. On the other hand, when the signal $S_{EL}$ supplied from the end-of-sheet detect signal level generator circuit 52 is transmitted through the OR gate circuit 54, the driver circuit 36 activates the laser beam generator to emit a laser beam with the laser radiation power output of the level $W_{SE}$ enabling the end-of-sheet sensor 28 to assuredly detect the laser beam emitted from the laser beam generator 10. When the image data signals $S_{IM}$ released from the frame data memory 34 are passed through the OR gate circuit 54, the driver circuit 36 activates the laser beam generator 10 to emit an information-carrying laser beam L modulated with the image data signals $S_{IM}$ supplied from the frame data memory 34.

The controller unit 32 further has output terminals respectively connected to a driver circuit 38 for the mirror drive motor $M_1$ and a driver circuit 40 for the main drive motor $M_2$. The controller unit 32 is operative to supply an analog signal $V_{M1}$ to activate the mirror drive motor $M_1$ by the driver circuit 38 and an analog signal $V_{M2}$ to activate the main drive motor $M_2$ by the driver circuit 50.

FIGS. 9A, 9B, 9C and 9D are timing charts respectively showing examples of the waveforms of signals which may appear in the control circuit hereinbefore described with reference to FIG. 7. Shown in FIG. 9A is an example of the waveform of the radiation power output $W_{LB}$ from the semiconductor laser beam generator 10. FIG. 9B shows an example of the waveform of the sweep start signal $S_{SS}$ output from the sweep start end sensor 26 and FIG. 9C shows an example of the waveform of the end-of-sheet detect signal $S_{SE}$ output from the end-of-sheet sensor 28. Further shown in FIG. 9D is an example of the waveform of each of the signals $V_{M1}$ and $V_{M2}$ to be supplied from the controller unit 32 to the driver circuits 38 and 40 for the polygonal mirror and main drive motors $M_1$ and $M_2$, respectively.

In operation, the image recording apparatus embodying the present invention is switched in with the print start switch 30 manually turned on by the operator. The apparatus being thus switched in with the print start switch 30 closed as at time $t_{11}$, the controller unit 32 outputs a signal $V_{M1}$ to enable the driver circuit 38 to actuate the polygonal mirror drive motor $M_1$ into operation. The polygonal mirror drive motor $M_1$ being thus actuated into operation, the polygonal mirror 16 is driven for rotation in the direction of the arrow a. At time $t_{11}$, the controller unit 32 also outputs a signal $V_{M2}$ to enable the driver circuit 40 to actuate the main drive motor $M_2$ into operation. The main drive motor $M_2$ being thus actuated into operation, the transport drum 22 is initiated into operation to turn in the direction of the arrow b and concurrently a light-sensitive sheet medium S is driven to advance toward the elongated light incidence zone E located in the vicinity of the transport drum.

In a certain period of time after the polygonal mirror drive motor $M_1$ is actuated into operation at time $t_{11}$, the operation of the motor $M_1$ will be stabilized and as a consequence the polygonal mirror 16 will be driven for rotation at a constant velocity as at time $t_{12}$. At time $t_{12}$, the controller unit 32 requests the time base circuit 46 to activate the sweep start signal level generator circuit 50 to output its signal $S_{SL}$ while supplying an enable signal to the frame data memory 34 to enable the memory 34 to release signals for the recording of the first line of images out of the image data signals $S_{IM}$ which have been stored therein. The image data signals $S_{IM}$ thus released from the frame data memory 34 are latched into the line data buffer register 48.

With the sweep start signal level generator circuit 50 activated at time $t_{12}$, the signal $S_{SL}$ output from the circuit 50 is passed through the OR gate circuit 54 to the driver circuit 36 to activate the laser beam generator 10 to emit a laser beam with the laser radiation power output of the predetermined level $W_{SS}$ dictated by the signal $S_{SL}$ as will be seen from the waveform illustrated in FIG. 9A. Such a laser beam emitted from the laser beam generator 10 will be detected by the sweep start end sensor 26, which thus produces the output signal $S_{SS}$ and supplies the signal $S_{SS}$ to the time base circuit 46 as at time $t_{13}$. In a predetermined period of time after the signal $S_{SS}$ is received from the sweep start end sensor 26, the time base circuit 46 de-activates the sweep start signal level generator circuit 50 and activates the line data buffer register 48 at time $t_{14}$ immediately subsequent to the time $t_{13}$.

The image data signals $S_{IM}$ for the recording of the first line of images latched in the line data buffer register 48 are now output from the buffer register 48 and are passed through the OR gate circuit 54 to the driver circuit 36 for the laser beam generator 10. In response to these image data signals $S_{IM}$ received from the frame data memory 34, the driver circuit 36 activates the laser beam generator 10, from which is thus emitted an information-carrying beam of laser L modulated with the image data signals $S_{IM}$ supplied from the frame data memory 34 as will be seen from the waveform illustrated in FIG. 9A.

Upon lapse of a predetermined period of time after time $t_{14}$ when the laser beam carrying the information for the recording of the first line of images is emitted from the laser beam generator 10, the time base circuit 46 activates the end-of-sheet detect signal level generator circuit 52 as at time $t_{15}$. With the end-of-sheet detect signal level generator circuit 52 activated at time t15, the signal $S_{EL}$ output from the circuit 52 is passed through the OR gate circuit 54 to the driver circuit 36 to activate the laser beam generator 10. Thus, the laser beam generator 10 is enabled to emit a laser beam component with the laser radiation power output of the predetermined level $W_{SE}$ indicated by the signal $S_{EL}$ in addition to the information-carrying beam L carrying the image data for the first line of images, as will be also seen from the waveform illustrated in FIG. 9A.

After the laser beam is emitted with the laser radiation power output of the predetermined level $W_{SE}$, the driver circuit 36 for the laser beam generator 10 is for a second time responsive to the image data signals $S_{IM}$ supplied from the line data buffer register 48 and emits the information-carrying beam of laser L modulated with the image data signals $S_{IM}$ until all the image data signals $S_{IM}$ for the recording of the first line of images are delivered from the buffer register 48.

At time $t_{16}$ when the release of all the image data signals $S_{IM}$ for the formation of the first line of images is complete, the time base circuit 46 for a second time activates the sweep start signal level generator circuit 50 so that the laser beam generator 10 is conditioned to emit a laser beam with the laser radiation power output of the level $W_{SS}$ dictated by the signal $S_{SL}$ output from the sweep start signal level generator circuit 50.

The laser beam emitted from the laser beam generator 10 is deflected to swing within the beam deflection range A and is thus captured repeatedly by the sweep start end sensor 26 each time the laser beam is swung back to the sweep start end $A_1$ of the range A. The output signal $S_{SS}$ from the sweep start end sensor 26 is thus provided in the form of a series of pulses synchronized with the rotation of the polygonal mirror 16. In response to these pulses supplied from the sweep start end sensor 26, the time base circuit 46 de-activates the sweep start signal level generator circuit 50 and activates line data buffer register 48 in the absence of a light-sensitive sheet medium over the elongated light incidence zone E of the apparatus. Each time the line data buffer register 48 is thus activated by the time base circuit 46, the image data signals $S_{IM}$ for the recording of the first line of images latched in the line data buffer register 48 are output from the buffer register 48 and the laser beam generator 10 is actuated to emit the information-carrying laser beam carrying the image data for the recording of the first line of images. On the information-carrying laser beam thus emitted cyclically from the laser beam generator 10 is superposed an end-of-sheet detecting laser beam component of the level $W_{SE}$ dictated by the signal $S_{SL}$ from the sweep start signal level generator circuit 50.

In the absence of a sheet medium located over the elongated light incidence zone E, the light incident on the transport drum 22 is mostly absorbed by the matted or otherwise light-absorptive peripheral surface of the drum 22 with the result that there is no light received by the end-of-sheet sensor 28 from the transport drum 22 and, as a consequence, there is no end-of-sheet detect signal $S_{SE}$ output from the end-of-sheet sensor 28, as will be seen from FIG. 9C.

At time $t_{17}$ after the transport drum 22 is initiated into operation and the light-sensitive sheet medium S driven to travel toward the transport drum 22, the sheet medium S will reach a position having its leading end located over the elongated light incidence zone E between the nip rollers 24 and 24' as indicated in FIG. 2. After the leading edge of the light-sensitive sheet medium S has thus arrived at the light incidence zone E, the laser beam which has been incident on the peripheral surface of the rotating transport drum 22 is partially reflected from the sheet medium S and is detected by the end-of-sheet sensor 28 when the beam of light reflected from the sheet medium S passes through the end-of-sheet sensor 28 located to approximately correspond to the middle point of the elongated light incidence zone E. The end-of-sheet sensor 28 is accordingly activated to produce the end-of-sheet detect signal $S_{SE}$ at time $t_{18}$ as indicated by the waveform of FIG. 9C, indicating that the leading edge of the light-sensitive sheet medium S has reached the light incidence zone E of the apparatus.

After it is thus detected that the leading edge of the light-sensitive sheet medium S has a new pulse is output as the signal $S_{SS}$ from the sweep start end sensor 26 with the laser beam swung back to the sweep starting end $A_1$ of the range A as at time $t_{19}$. The time base circuit 46 now de-activates the end-of-sheet detect signal level generator circuit 52 responsive to the end-of-sheet detect signal $S_{SE}$ from the end-of-sheet sensor 28 and the sweep start signal $S_{SS}$ from the sweep start end sensor 26. The end-of-sheet detect signal level generator circuit 52 is thus de-activated at time $t_{19}$ but pulses are produced as the signal $S_{SE}$ from the end-of-sheet sensor 28 which is responsive to a beam of light of the radiation power output of the level used for the generation of the information-carrying laser beam. At time $t_{19}$, the time base circuit 46 further requests the frame data memory 34 and line data buffer register 48 to output the image data signals $S_{IM}$ for the recording of the lines of images subsequent to the first line of images.

At time $t_{20}$ subsequent to the time $t_{19}$, the time base circuit 46 de-activates the sweep start signal level generator circuit 50 and activates the line data buffer register 48. The image data signals $S_{IM}$ for the recording of the first line of images latched in the line data buffer register 48 are now released from the buffer register 48 and are passed through the OR gate circuit 54 to the driver circuit 36 for the laser beam generator 10. In response to these image data signals $S_{IM}$, the driver circuit 36 activates the laser beam generator 10, from which is thus emitted an information-carrying beam of laser L modulated with the image data signals $S_{IM}$ for the first line of images.

A spot of light is now produced on the surface of the sheet medium S pressed tangentially against the peripheral surface of the transport drum 22 and is moved from the vicinity of the right end of the sheet medium S toward the other as indicated by arrow d in FIG. 1 by the information-carrying laser beam L incident on the sheet medium S. The first line of images is thus recorded on the surface of the light-sensitive sheet medium S along the elongated light incidence zone E by the information-carrying laser beam L being deflected to swing from the sweep starting end $A_1$ of the beam deflection range A. At a predetermined timing before the beam of light L reaches the sweep terminating end $A_2$ of the beam deflection range A, the time base circuit 46 activates the sweep start signal level generator circuit 50 so that the laser beam generator 10 is conditioned to emit a beam of light with the radiation power output level $W_{SS}$ as at time $t_{21}$.

After the image data signals $S_{IM}$ which have been latched in the buffer register 46 are thus completely released therefrom and the first line of images has been recorded on the sheet medium S.

After the first line of images is recorded, the next pulse is output as the signal $S_{SS}$ from the sweep start end sensor 26 as at time $t_{22}$ with the information-carrying laser beam L swung to the sweep starting end $A_1$ of the beam deflection range A. Upon lapse of a predetermined period of time after time $t_{22}$, the time base circuit 46 activates the line data buffer register 48 to release the image data signals $S_{IM}$ for the second line of images. These image data signals $S_{IM}$ are supplied to the driver circuit 36 for the laser beam generator 10 so that the laser beam generator 10 is actuated to emit a new information-carrying laser beam L for the recording of the second line of images as at time $t_{23}$. The second line of images is now formed on the surface of the light-sensitive sheet medium S by the newly emitted information-carrying laser beam L.

In these manners, a line of images is formed on the surface of the light-sensitive sheet medium S each time the information-carrying laser beam L is deflected to swing from the sweep starting end $A_1$ to the sweep terminating end $A_2$ of the beam deflection range A, as will be seen from FIG. 9A.

As will have been understood from the foregoing description, the embodiment of a laser-beam image recording apparatus according to the present invention as hereinbefore described is characterized, inter alia, in that an information-carrying laser beam for the first line of images is emitted cyclically as the end-of-sheet detecting laser beam until a light-sensitive sheet medium is detected to have reached the elongated light incidence zone of the apparatus and, once the arrival of the leading edge of the sheet medium at the light incidence zone, an information-carrying laser beam for the successive lines of images starting with the first line of images is applied to the light-sensitive sheet medium. An arrival of the leading edge of a light-sensitive sheet medium can thus be detected to a degree of accuracy which substantially corresponds to the width of the line delineated by the spot of the information-carrying laser beam incident on the transport drum 22 along the elongated light incidence zone E of the apparatus.

It has been described in connection with the second preferred embodiment of the present invention that the laser beam generator 10 is controlled to generate a laser beam modulated with the image data for the recording of the first line of images until the leading edge of a light-sensitive sheet medium being advanced to the elongated light incidence zone is detected to have reached the zone. This principle of control over the operation of the laser beam generator 10 is however merely by way of example and, as such, the laser beam generator of a laser-beam image recording apparatus according to the present invention of the type similar to the second preferred embodiment may be controlled to operate on the image data for the second or third lie of images or any one of a plurality of leading lines of images until the leading edge of a light-sensitive sheet medium being advanced to the elongated light incidence zone is detected to have reached the zone. Alternatively, the laser beam generator may be controlled to generate a laser beam modulated with the image data produced by averaging those for first and second or any two or more of a plurality of leading lines of images until the leading edge of a light-sensitive sheet medium being advanced to the light incidence zone is detected to have reached the zone.

To avoid the missing of some lines of images or the formation of an unwanted blank area on a leading end portion of the light-sensitive sheet medium in the embodiment hereinbefore described, the image data for the first line of image is used in modulating the laser beam before the leading edge of a light-sensitive sheet medium is detected to have reached the light incidence zone. Similar effects will be achieved for avoiding the missing of some lines of images or the formation of an unwanted blank area on a trailing end portion of the sheet medium if, for example, the image data for the last line of image is used in modulating the laser beam after the last line of images has been recorded on the sheet medium. For the prevention of the missing of images at the starting or terminating end of a line of images or the formation of an unwanted blank area adjacent a left or right marginal area of the sheet medium, the image data for the starting or terminating end of the line of image may be used in modulating the laser beam before and after the particular line of images is recorded on the sheet medium.

What is claimed is:

1. A laser-beam image recording apparatus for recording images on a light-sensitive sheet medium through irradiation of an information-carrying laser beam modulated depending on the image to be recorded by the beam, comprising
    (a) laser beam generating means for emitting a laser beam,
    (b) deflecting means for directing said laser beam toward a linear zone and deflecting the laser beam to swing repeatedly along the linear zone,
    (c) means for transporting a light-sensitive sheet medium to pass through said linear zone,
    (d) detecting means for detecting an arrival of the leading edge of the sheet medium at said linear zone, said detecting means including a sensor for producing an output signal responsive to the laser beam incident on said linear zone, the detecting means being operative to detect the arrival of the leading edge of the sheet medium at said linear zone on the basis of said signal, (e) said laser beam generating means having a first state operative to generate a laser beam for enabling said detecting means to detect the leading edge of a light-sensitive sheet medium, and a second state operative to generate said information-carrying laser beam, and (f) control means for controlling said laser beam generating means, said control means being operative to maintain said laser beam generating means in said first state before said detecting means detects that the leading edge of a light-sensitive sheet medium which has been advancing toward said linear zone reaches the linear zone and to shift the laser beam generating means from said first state into said second state after said detecting means detects that the leading edge of the light-sensitive sheet medium advanced toward said linear zone has reached the linear zone.

2. A laser-beam image recording apparatus as set forth in claim 1, in which said deflecting means comprises a rotatable polygonal mirror located to receive a laser beam from said laser beam generating means and re-direct the incident laser beam toward said linear zone, the laser beam incident on the linear zone being deflected to swing repeatedly along the linear zone as said polygonal mirror rotates.

3. A laser-beam image recording apparatus as set forth in claim 1, in which said laser beam generating means comprises a semiconductor laser radiation element and in which said control means is operative to control an electric signal to activate said semiconductor laser radiation element.

4. A laser-beam image recording apparatus as set forth in claim 1, in which said sensor is located to receive a laser beam reflected from a light-sensitive sheet medium extending through said linear zone and in which said control means is operative to control said laser beam generating means so that the generated by the laser beam generating means is directed to said sensor only in the presence of a light-sensitive sheet medium extending through said linear zone.

5. A laser-beam image recording apparatus as set forth in claim 4, in which said deflecting means and said linear zone are arranged so that, in the presence of a light-sensitive sheet medium extending through said linear zone, a laser beam generated by said laser beam generating means is incident on the light-sensitive sheet at a predetermined angle less than 90 degrees with respect to a plane normal to the surface of the sheet medium extending through the linear zone.

6. A laser-beam image recording apparatus as set forth in claim 4, in which said transport means comprises a support member having a light-absorptive surface for receiving thereon a light-sensitive sheet medium extending through said linear zone so that, in the presence of a light-sensitive sheet medium extending through said linear zone, a laser beam directed toward said linear zone is reflected from the surface of the light-sensitive sheet medium and re-directed toward said sensor and, in the absence of a light-sensitive sheet medium extending through said linear zone, a laser beam directed toward said linear zone is absorbed in the light-absorptive surface of said support member and is substantially not re-directed toward said sensor.

7. A laser-beam image recording apparatus as set forth in claim 6, in which said support member consists of a cylindrical drum having a center axis and rotatable about the center axis for transporting a light-sensitive sheet medium received on the peripheral surface thereof, said light-absorptive surface of said support member comprising the peripheral surface of said cylindrical drum.

8. A laser-beam image recording apparatus as set forth in claim 1, in which said sensor is located, in a direction in which a laser beam is to be directed toward said linear zone, beyond a plane containing said linear zone so that a laser beam directed toward said linear zone is allowed to reach said sensor only in the absence of a light-sensitive sheet medium extending through said linear zone.

9. A laser-beam image recording apparatus as set forth in claim 1, in which said control means is operative to control said laser beam generating means so that the laser beam generating means continuously generates a laser beam when the laser beam generating means is in said first state.

10. A laser-beam image recording apparatus as set forth in claim 1, in which said sensor is located to receive a laser beam directed to a predetermined location with respect to the direction in which the laser beam is incident on said linear zone, the deflecting means being operative to direct a laser beam toward said predetermined location only at a timing at which the laser beam is to pass through the predetermined location when said laser beam generating means is in said first state.

11. A laser-beam image recording apparatus as set forth in claim 1, in which said control means is operative to control said laser beam generating means such that said laser beam generating means generates a laser beam modulated depending on the images to be recorded on a leading end portion of a light-sensitive sheet medium supplied to said linear zone when the laser beam generating means is in said first state.

12. A laser beam image recording apparatus as set forth in claim 11, in which said sensor is located to receive a laser beam directed to a predetermined location with respect to the direction in which the laser beam is incident on said linear zone, said control means being operative to control said laser beam generating means to generate a laser beam at least at a timing at which the laser beam is to pass through said predetermined location when said laser beam generating means is in said first state.

13. A laser-beam image recording apparatus for recording images on a light-sensitive sheet medium through irradiation of an information-carrying laser beam, comprising (a) laser beam generating means for emitting a laser beam, (b) deflecting means for directing said laser beam toward a linear zone and deflecting the laser beam to swing repeatedly along the linear zone, (c) means for transporting a light-sensitive sheet medium to pass through said linear zone, (d) detecting means for detecting an arrival o the leading edge of the sheet medium at said linear zone, and (e) beam modulating means for modulating the laser beam to be generated by said laser beam generating means, said beam modulating means being operative to modulate the laser beam depending on the image to be recorded on a leading portion of a light-sensitive sheet medium before said detecting means detects that the leading edge of the light-sensitive sheet medium which has been advancing toward said linear zone reaches the linear zone and to modulate the laser beam depending on the images to be recorded on a portion subsequent to said leading portion of the light-sensitive sheet medium after said detecting means detects that the leading edge of the light-sensitive sheet medium advanced toward said linear zone has reached the linear zone.

14. A laser-beam image recording apparatus as set forth in claim 13, in which said detecting means comprises a sensor for producing an output signal responsive to the laser beam incident on said linear zone, the detecting means being operative to detect the arrival of the leading edge of the sheet medium at said linear zone on the basis of said signal.

15. A laser-beam image recording apparatus as set forth in claim 14, in which said sensor is located to receive a laser beam directed to a predetermined location with respect to the direction in which the laser beam is incident on said linear zone, said beam modulating means being operative to modulate the laser beam such that the laser beam generating means generates a laser beam at least at a timing at which the laser beam is to pass through said predetermined location before the leading edge of a light-sensitive sheet medium is detected to have reached said linear zone while a laser beam is swinging along said linear zone.

16. A laser-beam image recording apparatus as set forth in claim 13, in which said deflecting means comprises a rotatable polygonal mirror located to receive a laser beam from said laser beam generating means and re-direct the incident laser beam toward said linear zone, the laser beam incident on the linear zone being deflected to swing repeatedly along the linear zone as said polygonal mirror rotates.

17. A laser-beam image recording apparatus as set forth in claim 13, in which said laser beam generating means comprises a semiconductor laser radiation element and in which said beam modulating means is operative to control an electric signal to activate said semiconductor laser radiation element.

18. A laser-beam image recording apparatus as set forth in claim 14, in which said sensor is located to receive a laser beam reflected from a light-sensitive sheet medium extending through said linear zone and in which said control means is operative to control said laser beam generating means so that the generated by the laser beam generating means is directed to said sensor only in the presence of a light-sensitive sheet medium extending through said linear zone.

19. A laser-beam image recording apparatus as set forth in claim 18, in which said deflecting means and said linear zone are arranged so that, in the presence of a light-sensitive sheet medium extending through said linear zone, a laser beam generated by said laser beam generating means is incident on the light-sensitive sheet at a predetermined angle less than 90 degrees with respect to a plane normal to the surface of the sheet medium extending through the linear zone.

20. A laser-beam image recording apparatus as set forth in claim 18, in which said transport means comprises a support member having a light-absorptive surface for receiving thereon a light-sensitive sheet medium extending through said linear zone so that, in the presence of a light-sensitive sheet medium extending through said linear zone, a laser beam directed toward said linear zone is reflected from the surface of the light-sensitive sheet medium and re-directed toward said sensor and, in the absence of a light-sensitive sheet medium extending through said linear zone, a laser beam directed toward said linear zone is absorbed in the light-absorptive surface of said support member and is substantially not re-directed toward said sensor.

21. A laser-beam image recording apparatus as set forth in claim 20, in which said support member consists of a cylindrical drum having a center axis and rotatable about the center axis for transporting a light-sensitive sheet medium received on the peripheral surface thereof, said light-absorptive surface of said support member comprising the peripheral surface of said cylindrical drum.

22. A laser-beam image recording apparatus as set forth in claim 20, in which said sensor is located, in a direction in which a laser beam is to be directed toward said linear zone, beyond a plane containing said linear zone so that a laser beam directed toward said linear zone is allowed to reach said sensor only in the absence of a light-sensitive sheet medium extending through said linear zone.

23. A laser-beam image recording apparatus for recording images on a light-sensitive sheet medium through irradiation of an information-carrying laser beam modulated depending on the image to be recorded by the beam, comprising
(a) laser beam generating means for emitting a laser beam,
(b) means for directing said laser beam toward a linear zone and deflecting the laser beam to swing repeatedly along the linear zone,
(c) means for transporting a light-sensitive sheet medium to pass through said linear zone,
(d) detecting means for detecting an arrival of the leading edge of the sheet medium at said linear zone, said detecting means including a sensor for producing an output signal responsive to the laser beam directed to a predetermined location with respect to the direction in which the laser beam is incident on said linear zone, the detecting means being operative to detect the arrival of the leading edge of the sheet medium at said linear zone on the basis of said signal, and
(e) control means for controlling said laser beam generating means, said control means being operative to control said laser beam generating means such that the laser beam is generated by the laser beam generating means at a timing at which the laser beam incident in said linear zone reaches said predetermined point before said detecting means detects that the leading edge of a light-sensitive sheet medium which has been advancing toward said linear zone reaches the linear zone and that laser beam generating means generates said information-carrying laser beam after said detecting means detects that the leading edge of the light-sensitive sheet medium advanced toward said linear zone has reached the linear zone.

24. A laser-beam image recording apparatus as set forth in claim 23, in which said deflecting means comprises a rotatable polygonal mirror located to receive a laser beam from said laser beam generating means and re-direct the incident laser beam toward said linear zone, the laser beam incident on the linear zone being deflected to swing repeatedly along the linear zone as said polygonal mirror rotates.

25. A laser-beam image recording apparatus as set forth in claim 23, in which said laser beam generating means comprises a semiconductor laser radiation element and in which said control means is operative to control an electric signal to activate said semiconductor laser radiation element.

26. A laser-beam image recording apparatus as set forth in claim 23, in which said sensor is located to receive a laser beam reflected from a light-sensitive sheet medium extending through said linear zone and in which said control means is operative to control said laser beam generating means so that the generated by the laser beam generating means is directed to said sensor only in the presence of a light-sensitive sheet medium extending through said linear zone.

27. A laser-beam image recording apparatus as set forth in claim 26, in which said deflecting means and said linear zone are arranged so that, in the presence of a light-sensitive sheet medium extending through said linear zone, a laser beam generated by said laser beam generating means is incident on the light-sensitive sheet at a predetermined angle less than 90 degrees with respect to a plane normal to the surface of the sheet medium extending through the linear zone.

28. A laser-beam image recording apparatus as set forth in claim 26, in which said transport means comprises a support member having a light-absorptive surface for receiving thereon a light-sensitive sheet medium extending through said linear zone so that, in the presence of a light-sensitive sheet medium extending through said linear zone, a laser beam directed toward said linear zone is reflected from the surface of the light-sensitive sheet medium and re-directed toward said sensor and, in the absence of a light-sensitive sheet medium extending through said linear zone, a laser beam directed toward said linear zone is absorbed in the light-absorptive surface of said support member and is substantially not re-directed toward said sensor.

29. A laser-beam image recording apparatus as set forth in claim 28, in which said support member consists of a cylindrical drum having a center axis and rotatable about the center axis for transporting a light-sensitive sheet medium received on the peripheral surface thereof, said light-absorptive surface of said support member comprising the peripheral surface of said cylindrical drum.

30. A laser-beam image recording apparatus as set forth in claim 23, in which said sensor is located, in a direction in which a laser beam is to be directed toward said linear zone, beyond a plane containing said linear zone so that a laser beam directed toward said linear zone is allowed to reach said sensor only in the absence of a light-sensitive sheet medium extending through said linear zone.

* * * * *